United States Patent [19]

Gozdiff

[11] Patent Number: 4,705,161
[45] Date of Patent: Nov. 10, 1987

[54] HEAT RESISTANT BELT

[75] Inventor: Michael Gozdiff, N Canton, Ohio

[73] Assignee: The Goodyear Tire & Rubber Company, Akron, Ohio

[21] Appl. No.: 898,916

[22] Filed: Aug. 21, 1986

[51] Int. Cl.⁴ ............................................. B65G 15/34
[52] U.S. Cl. .................................... 198/847; 428/246; 428/247; 428/250; 428/251; 428/252
[58] Field of Search ............... 428/246, 247, 250, 251, 428/252, 492; 198/846, 847

[56] References Cited

U.S. PATENT DOCUMENTS

| | | | |
|---|---|---|---|
| 2,310,819 | 2/1943 | Orden | 198/847 |
| 2,633,227 | 3/1953 | Hutchins | 198/847 |
| 3,335,843 | 8/1967 | Duvivier et al. | 198/847 |
| 3,593,840 | 7/1971 | Guyer | 198/847 |
| 3,596,753 | 8/1971 | Knapp et al. | 198/847 |

Primary Examiner—James J. Bell
Attorney, Agent, or Firm—J. D. Wolfe; R. D. Thompson

[57] ABSTRACT

This invention supplies an insulating conveying belt composed of a belt carcass having at least one embedded reinforcing ply, a pulley cover and a top cover, said top cover having a heat resistant member adhered to said top cover, said heat resistant member being selected from the class consisting of fibers of aramid, glass, ceramic or mixtures thereof. This member may be woven or non-woven such as a punched felt mat. Preferably the fibers of the heat resistant member are woven rather than being of the non-woven type. The elastomer preferably is EPDM or blends of EPDM and silicone rubber with carbon black or silica filler.

11 Claims, 1 Drawing Figure

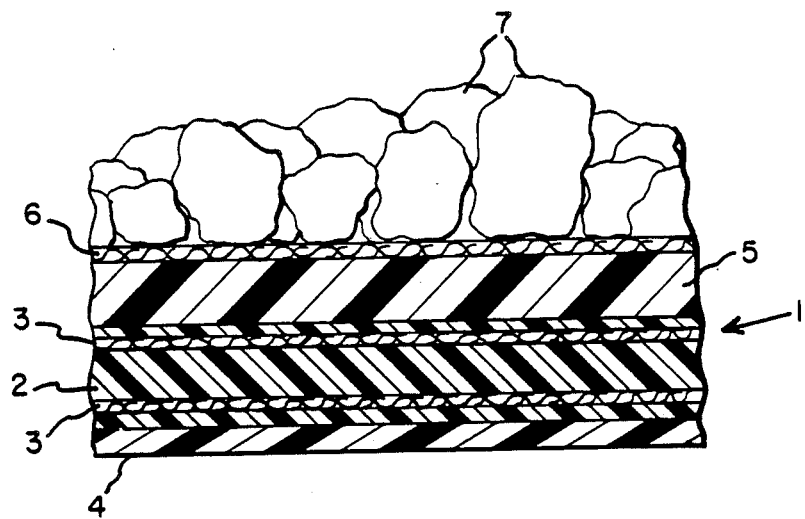

HEAT RESISTANT BELT

FIELD OF THE INVENTION

This invention relates to a conveyor belt containing an insulative layer adhered or attached to the cover layer of said belt. More particularly this invention relates to a conveyor belt that receives hot loadings and which has a fibrous mat or felt of insulative material to insulate and protect the underlying belt from the excessive heat, in isolated places of roughly 538° C. to 983° C. for short times.

This invention supplies an insulating conveying belt composed of a belt carcass having at least one embedded reinforcing ply, a pulley cover and a top cover, said top cover having a heat resistant member adhered to said top cover, said heat resistant member being selected from the class consisting of fibers of aramid, glass, ceramic or mixtures thereof. This member may be woven or non-woven such as a punched felt mat. Preferably the fibers of the heat resistant member are woven rather than being of the non-woven type. The elastomeric content preferably is EPDM or blends of EPDM and silicone rubber with carbon black or silica filler.

PRIOR ART

The current state of art employs high temperature resistant elastomers such as EPDM & EPR with fillers, low volatility plasticizers and usually with sulfur donor or peroxide cure systems. The reinforcement is usually nylon, aramid, glass or steel fabrics. Some manufactures have also included burn shields made of very high temperature resistant fabric embedded well beneath the top cover's surface and above the fabric reinforced carcass—to prevent the payload from burning through the rubber top cover into the carcass, destroying the belt. This invention, instead, puts the fabric onto the top surface to protect both the top cover and the carcass as well.

Japanese Pat. No. JP 244 452 provides a heat-resistant conveyor belt having a surface of EPDM or EPR rubber containing 60 or less percent diorganopolysiloxane silica, a hardener and a small amount of maleimide which allows the cover to be subjected to direct heat of the loadings and to experience heat cracking.

THE INVENTION INCLUDING THE BELT MADE

The nature of this invention and its advantages may be better understood and appreciated by reference to the drawing where the figure is a schematic cross-sectional view of the inventive belt containing a hot pay load.

Referring specifically to the figure, numeral 1 designates the belt in generally having a body carcass 2 composed preferably of one or more fabric layers 3 such as the polymeric fibers, glass or wire embedded in or covered with elastomer 4 and plied together to form a belt carcass body. The body carcass 2 preferably has an elastomeric pulley cover 4 adhered or plied thereto with a top elastomeric cover 4 adhered or plied thereto with a top elastomeric cover 5 on top of the body. My invention provides an insulative layer 6 of a fabric or belt either woven or non-woven to separate and insulate the elastomer of the top cover 5 as well as the body carcass from the hot pay load 7 to thereby increase the temperature resistance of the belt and to increase the service life of the belt.

The nature of the belt is well known where the elastomers may be any of the rubbers known for their heat resistance such as EPDM rubber or EPR rubber. NBR, SBR and neoprene may be used, but usually are EPDM and EPR rubbers. These rubbers are usually loaded with relatively high loadings of fillers, 50 to 150 parts per hundred of rubber. Suitable fillers are carbon black, hydrated precipitated silica and hydrated alumina to mention those well known and preferred. Low volatility plasticizers such as ASTM-D-2226, Type 104B paraffinic oil, such as Sunpar 2280, polysiloxane oils, polysiloxane rubbers, polyisobutylene isoprene rubber and polyisobutylene may be used to give the desired degree of flexibility. These rubbers are cured with the usual sulfur donor or donors or with a peroxide at the usual temperatures—about 135°–180° C. and pressures of 0.3 to 14.0 MPa. The fabric layers 3 can be at least one or more and usually are made from polyamides viz nylon or aramid types, glass or metal fibers in any of the types used in making belts. The cover stocks for covers 4 and 5 are made of the usual elastomeric materials such as the EPDM or EPR rubbers compounded with a curative, low volatility plasticizer, various fillers and burn-resistant materials such as the silicones.

The preferred belt body is composed of a blend of about 85/95% EPDM rubber/15/5% silicone rubber, a peroxide curative, about 15 to 30 parts of carbon black, some antioxidant preferably up to 10 parts, and no liquid plasticizer. Also, this composition can be used to impregnate the burn resistant member to aid in bonding it to the belt. Finely divided silica may be used as well as carbon black for filler in the elastomer used either in the carcass or the cover stock.

The specific and general advantages of this invention are further exemplified and represented by the following examples:

EXAMPLE 1

A project was established to evaluate the effect of adding a burn shield to the surface of a conventional heat belt for improved service life in severe heat applications.

The fabrics evaluated were: (1) glass scrim, (2) Kevlar scrim, and (3) square woven fabric nylon warp/glass fill.

The test procedure used is as follows: a metal punch was rounded off to a point with a 0.635 centimeter radius. The punch was welded to a metal plate. The samples to be evaluated were supported on a tripod and the heated punch was placed on the sample for a one minute dwell with 89 newtons force on the probe. The penetration into the belt was then recorded.

The metal probe was heated in a baffel furnace and tests were made at two temperatures, 538° C. and 983° C.

The sample used was a 2 ply 0.70cm thick heat belt having a burn shield or cover thereon as shown.

| Burn Shield | 538° C. | 983° C. |
| --- | --- | --- |
| No burn shield | 0.37 cm penetration | 0.70 cm penetration (completely through sample |
| Nylon/glass fill | 0.18 cm penetration | 0.53 cm penetration |
| Kevlar scrim | 0.18 cm | 0.28 cm |

| -continued | | |
|---|---|---|
| Burn Shield | 538° C. | 983° C. |
| Glass scrim | penetration 0.07 cm penetration | penetration 0.18 cm penetration |

Based on the results obtained, a glass scrim offered additional protection to belts exposed to applications where hot shots are expected.

What is claimed is:

1. An insulating conveying belt composed of a belt carcass having at least one embedded reinforcing ply, a pulley cover and a top cover, said top cover having a heat resistant member adhered to said top cover, said heat resistant member being selected from the class consisting of fibers of aramid, glass, ceramic or mixtures thereof.

2. The belt of claim 1 wherein the heat resistant member is glass.

3. The belt of claim 1 wherein the heat resistant member is glass containing some polyamide of the high melting aramid class.

4. The belt of claim 1 wherein the heat resistant member is of woven fibers.

5. The belt of claim 1 wherein the cover is composed of an elastomer selected from EPDM rubber or a blend of EPDM rubber and silicone rubber.

6. The belt of claim 1 wherein the cover is composed of an EPDM rubber.

7. The belt of claim 2 wherein the heat resistant member is glass scrim.

8. The belt of claim 1 wherein the heat resistant member is a scrim of a polyamide of the high melting aramid class.

9. The belt of claim 5 wherein the elastomer is a blend of about 85/95% EPDM rubber and 15/5% of silicone rubber.

10. An insulative conveying belt comprising: a carcass containing reinforcing ply therein; a pulley cover; a top cover; and a heat resistant member integral with and on top of the top cover composed of fibers of aramid, glass, ceramic or mixtures thereof said belt having an improved resistance to penetration of said cover as tested by penetrating said cover to a depth of less than 0.18 cm by a punch rounded to a point with 0.635 centimeters radius subjected to a force of 89 newtons for one minute.

11. The belt of claim 10 wherein the heat resistant member is impregnated with EPDM rubber, silicone rubber or blends thereof.

* * * * *